Aug. 9, 1960     I. JEPSON     2,948,063
HEAD FOR ELECTRICALLY OPERATED HAIR CLIPPING AND SHAVING DEVICE
Filed May 20, 1957     2 Sheets-Sheet 1

INVENTOR.
Ivar Jepson
BY George R. Clark
Atty:

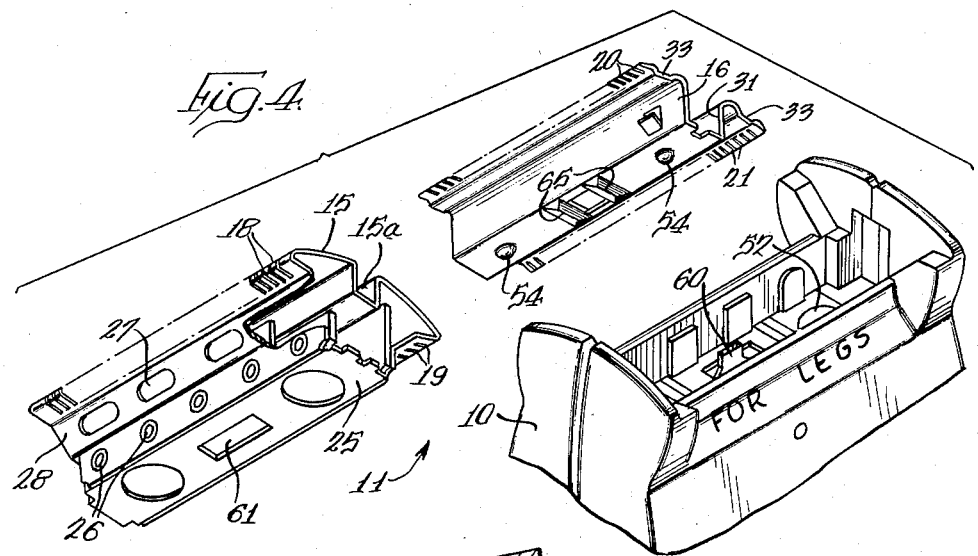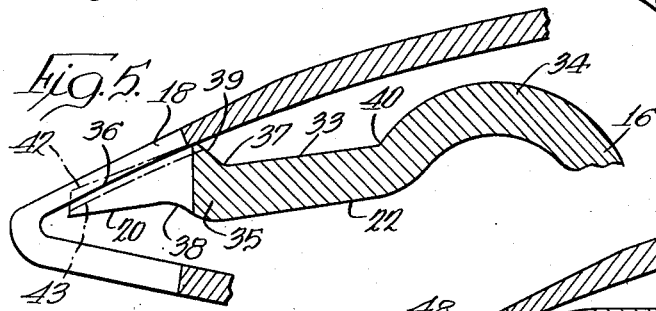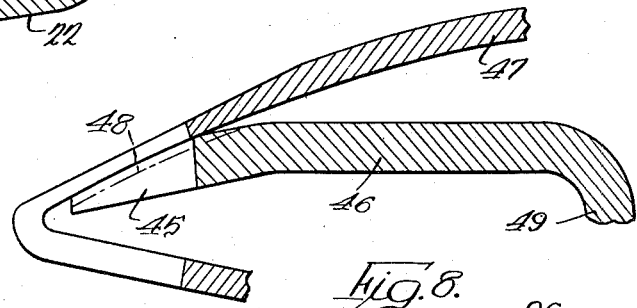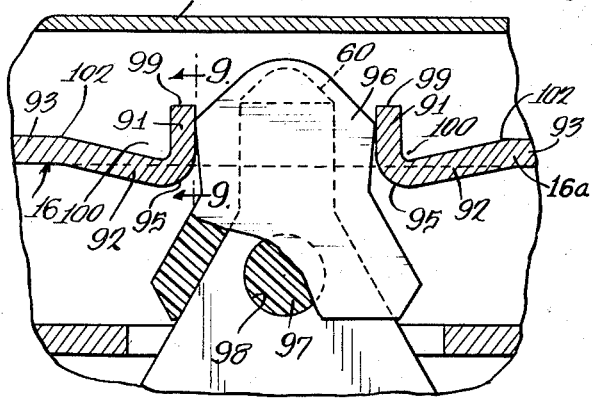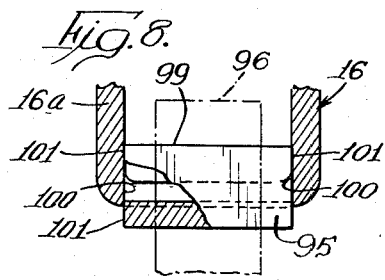
INVENTOR.
Ivar Jepson
BY
George R. Clark
Atty.

United States Patent Office 2,948,063
Patented Aug. 9, 1960

2,948,063

HEAD FOR ELECTRICALLY OPERATED HAIR CLIPPING AND SHAVING DEVICE

Ivar Jepson, Oak Park, Ill., assignor to Sunbeam Corporation, Chicago, Ill., a corporation of Illinois Filed May 20, 1957, Ser. No. 660,279

3 Claims. (Cl. 30—43)

The present invention relates to an electrically operated hair clipping and shaving device, and, more particularly, to a shaver designed for the needs of women.

A lady's shaver such as that disclosed and claimed in copending application Serial No. 544,212, filed November 1, 1955, by Ivar Jepson and Sigmund R. Kukulski is provided with a shearing assembly comprising a tubular comb having one face slightly curved with the edges thereof slotted to form teeth and a cutter of spring sheet metal slidable within said tubular comb and having a channel-like central portion and provided with flanges having teeth along the edge portions, together with means for urging the toothed edge portions of the flanges into engagement with the slotted portions of the comb. Thus, there are two cutting portions provided on the shearing assembly, one along one edge of the face of the comb and the other along the other edge thereof. To provide a very effective, close-fitting assembly, the comb and cutter are assembled in one relationship and the cutting portions thereof are lapped in during the fabrication of the shaver. The teeth of the cutter along the edge portions of the flanges thereof are lapped or honed into the adjacent portions of the comb, while the comb and the cutter are in definite positions relative to one another. Thereafter, it is essential that the comb and the cutter always be assembled in this relationship to one another so that the cooperating shearing portions thereof are in perfect, lapped positions relative to one another.

During the manufacture of the cutter, it is perforated and blanked from sheet stock, formed with the channel and flanges, and then slots are formed in the edge portions of the flanges to form rows of teeth therealong. The cutter then is heat-treated to harden it, after which the faces of the teeth to engage the comb are ground to the general shape of the portions of the comb that they are intended to engage. The cutter is assembled with the comb and these two elements are lapped in. During the heat-treating operation, excessive warping of the flanges sometimes occurs, which makes the lapping step difficult and also wears away the teeth unevenly. Shavers of this general type known hitherto have also been difficult to lap in because portions of the comb and cutter not operative during the shaving process have been in engagement with one another so that they had to be ground together along with the operating portions of the comb and cutter. This increased the difficulty of lapping in the comb and cutter, and also made for difficulties in keeping the comb and cutter sharp after long use thereof.

It is accordingly an object of the invention to provide new and improved cutter heads for shavers.

Another object of the invention is to provide a cutter head in which the cutter must always be assembled with the comb in one relationship.

Still another object of the invention is to provide a cutter head in which the cutter and the comb are provided with portions which permit free assembly when in a desired relationship to one another and prevent assembly of these elements when this relationship is reversed.

Another object of the invention is to provide a shaving head having a comb of sheet material provided with toothed flanges which are sufficiently strong to prevent warping thereof during heat-treating thereof.

Yet another object of the invention is to provide a shaver cutter head in which only the operative portions of the comb and the cutter need be fitted together by lapping or honing.

A further object of the invention is to provide a dry shaver cutter head in which there is a comb having teeth along opposite edges thereof and a cutter formed of sheet material and also provided with teeth along opposite edges thereof pressed to offset positions so that, as the cutter is pressed toward the comb, only the teeth of the comb and the cutter are pressed into engagement with one another.

A still further object of the invention is to provide a simple efficient and inexpensive cutter head for a dry shaver for ladies.

One other object of the invention is to provide a sheet metal cutter having large area drive plates cut and bent therefrom and engaged by a cover of nylon mounted on a drive lever.

Other objects and advantages of the present invention will become apparent as the following description proceeds, and the features of novelty which characterize the invention will be pointed out with particularity in the claims annexed to and forming part of this specification.

For a better understanding of the present invention, reference may be had to the accompanying drawings, in which:

Fig. 4 is an exploded perspective view of the shearing assembly and the portion of the casing of the hair removing device of the present invention to which the shearing assembly is adapted to be attached;

Fig. 5 is a greatly enlarged fragmentary, vertical section taken along line 5—5 of Fig. 1;

Fig. 6 is a greatly enlarged vertical section of a comb and cutter of shaving device over which the present invention is an improvement;

Fig. 7 is a fragmentary vertical section view of a cutter and drive lever of a shaver forming an alternate embodiment of the invention; and Fig. 8 is a fragmentary vertical section taken along line 8—8 of Fig. 7.

The present invention provides a lady's electric hair removing device or dry shaver particularly designed to remove both underarm and leg hair, and is provided with a shearing assembly in which the cutter may be slid out of the comb for cleaning and may be slid back into the comb in only one direction. This is accomplished by a tab or lug pressed out of a channel-like central portion of the cutter and a cut-out portion or notch of the channel of the comb, which notch provides clearance for the lug. The notch is located at one end only of the comb and the lug is similarly located at one end only of the cutter. Consequently, the cutter cannot be completely inserted into the comb unless the lug is in a position to enter the notch, which results in the desired orientation of the cutter relative to the comb.

The comb is provided with a curved top portion formed of sheet metal stock and having slotted edge portions to form teeth along the edge portions. The cutter has flanges extending laterally from a central, channel-like portion and each of the flanges is provided with a slotted outer edge to form teeth designed to cooperate with the teeth of the comb. The toothed portions of the flanges are pressed to positions offset upwardly relative to the portions of the flanges immediately adjacent thereto so that as the cutter is biased upwardly against the comb, only the tooth portions of the cutter engage the comb, and as the comb is reciprocated relative to the cutter, only the toothed portions of the comb and cutter are lapped to one another. Furthermore, the webs formed by offsetting the toothed portions impart stiffness to the flanges so that warping thereof is prevented during the heat-treating of the cutter. In a shaver forming an alternate embodiment of the invention, a channel-like cutter has large area bearing plates punched and formed in the bottom thereof for engagement by a nylon shoe mounted on the end of the driving lever. The large area bearing plates effect long wear of the nylon shoe.

Figure 1:
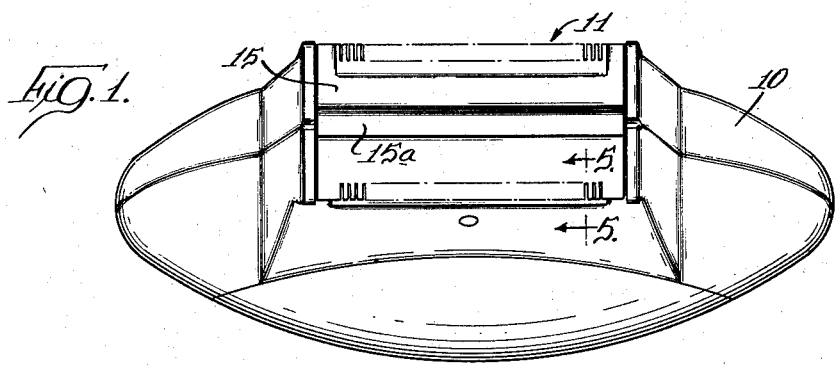
Fig. 1 is a fore-shortened view of an electrical hair removing device forming one embodiment of the invention.

In the shaver shown in Fig. 1, there is provided a casing 10 including an electric driving mechanism 12 (Fig. 2) for driving the shaver head 11. The shaver head 11 includes a comb 15 and a cutter 16 reciprocable along the comb. The comb 15 is provided with a guide channel 15a and gently curved upper faces 17 having spaced, tapered teeth 18 and 19 along the outer edges thereof formed by milling slots into the edges of the comb. The teeth 18 and 19 cooperate with tapered teeth 20 and 21, respectively, formed on opposite edges of flanges 22 and 23 of the cutter 16 by milling tapered slots in the edge portions of the flanges. The comb 15 is generally tubular and is secured by rivets 26 (Fig. 4) to a channel-shaped mounting base 25, which forms a tubular comb assembly with the comb 15. The comb is also provided with holes 27 in lower side portions 28 thereof to permit cut hairs to fall out of the comb.

Figure 3:
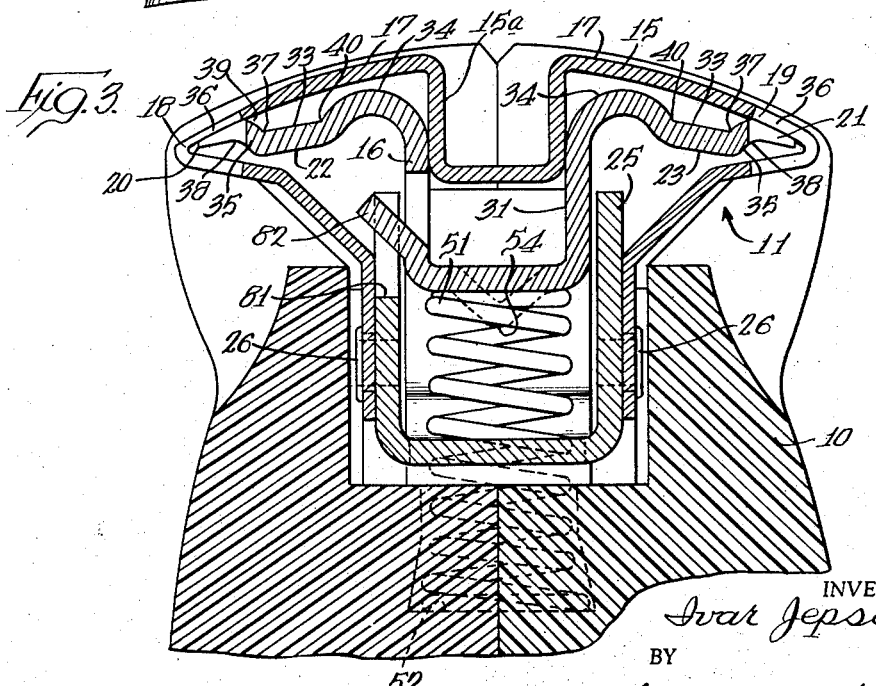
Fig. 3 is an enlarged vertical section taken along line 3—3 of Fig. 2.

The cutter 16 is provided with a channel-like base 31 supporting the flanges 22 and 23 in positions extending laterally of channel or base 31, and the entire cutter 16 is formed from spring sheet stock with the channel-like base 31 drawn from the stock and the flanges 22 and 23 lying generally in the plane of the sheet stock. The flanges 22 and 23 have central portions or depressed portions 33 (Figs. 3 and 5) depressed downwardly out of plane of the sheet stock from which the cutter 16 is formed so that the portions of the flanges 22 and 23 immediately adjacent to the teeth 20 and 21, respectively, are depressed away from the teeth 20 and 21 and provide stiffening webs 35 extending along and disposed generally normal to the flanges 22 and 23 and to the faces 17 of the comb 15. The formation of the shallow channels or depressed portions 33 in the flanges is so effected that sharp inside corners 37 are formed between the depressed portions 33 and the webs 35. Curved undersides 38 are formed under the teeth 20 and 21 and the webs 35, and curved uppersides 39 of the webs 35 extend sharply away from the portions of the comb 15 to which they are adjacent and from upper faces 36 of the teeth 20 and 21. The depressed portions 33 blend into curved spring portions 34 with arcuate corner portions 40.

After milling with tapered milling cutters to form the teeth 20 and 21, the comb is heat-treated to harden it, a black protective surface is formed thereover, and then the toothed edge portions of the flanges 22 and 23 are ground to a slightly larger radius than the curved portions 17 of the comb 15.

The comb 15 and the cutter 16 then are assembled. At this time outer tips 42 only of teeth 20 and 21 engage the comb 15 due to the angles at which the teeth are disposed relative to the comb. Also, the radius of the faces 36 is slightly larger than the radius of the portions 17. But, the cutter and comb then are lapped together to form the faces 36 so that the entire upper faces 36 engage the comb. By the resulting construction in which the webs extend sharply away from the upper faces 36, as the faces 36 wear away during long use of the shaver, the faces 43, for example, only slight portions of the webs 35 are worn. This provides the salutary effect of causing the outer portions of the teeth to keep in engagement with the comb throughout such wear as contrasted with the prior art in which a large area portion of the unslotted metal of the cutter is worn into, as illustrated in Fig. 6. The short length of the teeth and the sharp dropping off of the webs permit the teeth to be readily lapped in even if the manufacturing error of the teeth is such that the teeth initially engage the comb only at the heels thereof rather than at the tips as is desired. In the prior art construction shown in Fig. 6, cutter teeth 45 generally in the plane of flange 46 of cutter 49 initially are lapped in perfectly to the comb 47. But, as the cutter wears, to face 48, for example, a wide area of the unslotted portion of flange 46 is worn into and this has a tendency to cause the cutter teeth to wear away before the unslotted portion so that the teeth are not kept in so close engagement with the comb 47 as are the teeth 20 and 21 of the cutter 16 with the comb 15.

Compression springs 51 pressing against the bottoms of bores 52 (Fig. 3) formed in the casing 10 fit over buttons 54 drawn out of the bottom of the channel 31 of the cutter 16 and urge the cutter 16 upwardly with the faces 36 of the teeth 20 and 21 engaging the toothed portions of the comb 15. The electric drive 12 enclosed in the housing 10 of the shaver oscillates a driving lever 60 (Fig. 2), which slides the cutter 16 back and forth along the comb 15 during the shaving operation. The lever 60 projects through a slot 61 in the channel 31 and into engagement with a slot 62 in the cutter base 31. Buttons 65 are provided to guide the lever 60 into position in slot 62 during assembly of the cutter head with the housing. The buttons are so spaced as not to bind with the lever 60 as it oscillates from one angular position relative to the cutter to another angular position relative thereto in driving the cutter. A sealing gasket 66 is provided over the lever 60 to prevent hair from falling into the casing 10. Retaining plates 71 and 72 fit into the casing 10 and resiliently lock the comb in assembled position relative to the casing 10 by means of the engagement of the channel 25 of the comb assembly by notches 75 formed in retaining plates 71 and 72. Screws 77 serve to lock the casing tabs together.

Figure 2:
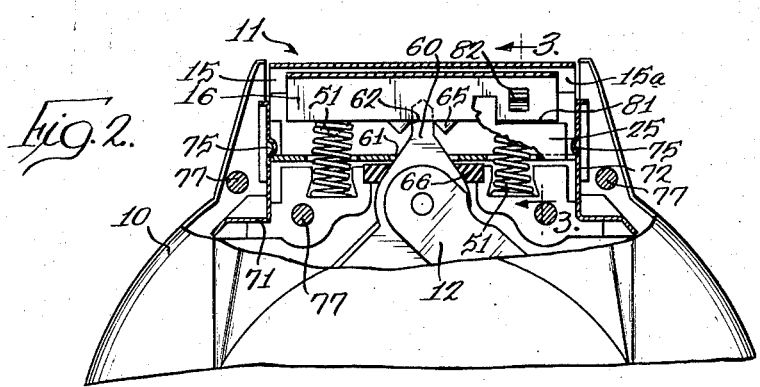
Fig. 2 is a fragmentary side elevational view of the device shown in Fig. 1 with portions thereof broken away and portions shown in section.

The right-hand end portion of the channel 25, as viewed in Fig. 2, is provided with a notch 81 open at the right-hand end thereof which is designed to receive a tab 82 pressed out of the right-hand end portion of the base 31 of the cutter 16. The tab 82 is designed to project into the notch 81 when the cutter and combs are correctly assembled, and is so positioned that the cutter 16 may be completely inserted into the comb 15 and reciprocated back and forth during the shaving operation without the tab engaging any portion of the channel 25. However, the channel-like base 31 fits fairly closely in the channel 25, and if, after the cutter 16 is disassembled from the comb 15 and it is attempted to insert the cutter 16 into the comb in reverse positions with the teeth 20 adjacent to the teeth 19 in the comb 15 and the teeth 21 adjacent to the teeth 18 of the comb, the tab or lug 82 engages the end of the channel 25 before the cutter can be completely inserted into the comb so that the user is immediately apprised that the comb and cutter are not properly oriented. Thus, the cutter 16 must be inserted correctly into the comb 15 before the shearing head can be assembled to the shaver. This insures that the lapped faces 36 of the cutter teeth are always adjacent to the toothed portions of the comb with which they have been lapped.

In one constructed embodiment of the invention, the cutter 16 was formed of spring steel coil stock of about .020 inch in thickness, and was formed to the configuration described above, after which it was heat-treated by a known process, the teeth 20 and 21 were ground, it was assembled with the comb 15 and lapped with the cutter, with the resulting thickness of the tips of the teeth 20 and 22 being about .009 inch. There was no detectable warping of the cutter from the heat treatment, and during prolonged operation, the tips of the teeth wore no more than the base portions thereof so that the entire upper faces of the teeth were kept in contact with the teeth of the comb with a consequent sharpness and highly effective cutting throughout such use.

The above-described shaving head is very precisely constructed with the teeth of the comb and cutter lapped together with a minimum of lapping. The webs 33 make this possible by preventing substantially any warping during the hardening steps. The cooperating notch and lug on the comb and cutter, respectively, insure that the cutter head must always be assembled correctly so that the lapped teeth of the comb 15 and cutter 16 are in engagement with one another.

In the shaver shown in Figs. 7 and 8, a cutter 16 has large area, upstanding, bearing plates 91 cut and formed from the bottom 93 of the channel 16a. The plates 91 are supported by cup portions 92 also cut from the bottom 93 and with bottoms sloping downwardly out of the plane of the bottom 93 of the channel 16a and joined integrally to the plates 91 by gently curved guiding surfaces 95. The guiding surfaces taper so as to facilitate guiding a noise-suppressing, round-nosed, cover 96 of nylon on the lever 60 into assembled position between the plates 91. The lever 60 is pivotal by a vibratory motor (not shown), and pushes the cutter back and forth through the nylon cover 96. The cover 96 preferably is molded on the lever and has a boss portion 97 fitting into the hole 98 to secure the cover on the lever.

The plates 91 engage large areas of the cover so that pressure on and wear of the cover is minimized. The cover prevents noise from the drive of the cutter. The plates 91 and cup portions 92 are made by shearing ends 99 from one another and simultaneously cutting to form edges 100 and 101. The bends 95 and 102 are formed also after the cutting or shearing operation in a drawing or coining operation pushing the bottoms of cup portions 92 downwardly.

While there has been illustrated and described particular embodiments of the present invention, it will be appreciated that numerous changes and modifications are likely to occur to those skilled in the art, and it is intended in the appended claims to cover all those changes and modifications as fall within the true spirit and scope of the present invention.

What is claimed as new and desired to be secured by Letters Patent of the United States is:

1. A head for a dry shaver comprising a cutter having a pair of outwardly extending flanges, two rows of cutter teeth defined along the outer ends of said flanges, depressed portions formed in said flanges parallel to and immediately adjacent said rows of teeth to strengthen said flanges and prevent twisting thereof, the portion of each said flange connecting the row of teeth to said depressed portion extending downwardly at a sharp angle to the plane defined by the upper face of said teeth, a comb having two rows of teeth thereon, and resilient means biasing said cutter teeth into engagement with said comb teeth, said flanges engaging said comb only along said two rows of cutter teeth.

2. A head for a dry shaver comprising a cutter having a center channel extending longitudinally thereof and flanges extending laterally from the upper edges of said channel, cutter teeth defined along the outer edges of said flanges, a hollow comb having open ends and receiving said cutter for reciprocation therein, a channel-shaped base portion on said comb, an upper comb portion secured to the side walls of said channel-shaped base, the top of the said upper comb portion defining a curved surface with a channel portion extending longitudinally in the center thereof, said channel portion of said comb slideably receiving said central channel of said cutter, the lower portion of said central channel received within the upper portion of said channel-shaped base, a cutout portion on one end of said channel-shaped base, an integral projection on the central channel of said cutter received in said cutout portion, and teeth on said comb in cutting engagement with said teeth on said cutter.

3. A head for a dry shaver comprising a cutter having a central channel extending longitudinally thereof and flanges extending laterally from the upper edges of said channel, cutter teeth defined along the outer edges of said flanges, longitudinally extending depressed portions formed in each flange immediately adjacent the inner ends of said teeth, a hollow comb having open ends and receiving said cutter for reciprocation therein, a channel-shaped base portion on said comb, the lower portion of said central channel received within the upper portion of said channel-shaped base, said comb having rows of teeth in cutting engagement with said cutter teeth, the cutter teeth being the only portions of said flanges engaging said comb.

References Cited in the file of this patent

UNITED STATES PATENTS

| | | |
|---|---|---|
| Re. 22,638 | Kleinman | Apr. 24, 1945 |
| 2,132,644 | Rand et al. | Oct. 11, 1938 |
| 2,141,582 | Wimberger | Dec. 27, 1938 |
| 2,167,833 | Gold | Aug. 1, 1939 |
| 2,195,839 | Kleinman | Apr. 2, 1940 |
| 2,200,185 | Muros | May 7, 1940 |
| 2,205,905 | Muros | June 25, 1940 |
| 2,237,869 | Rand | Apr. 8, 1941 |
| 2,253,037 | Knapp | Aug. 19, 1941 |
| 2,253,195 | Oster | Aug. 19, 1941 |
| 2,259,002 | Knapp | Oct. 14, 1941 |
| 2,272,053 | Altemus | Feb. 3, 1942 |
| 2,273,524 | Jensen et al. | Feb. 17, 1942 |
| 2,290,326 | Hanley | July 21, 1942 |
| 2,331,501 | Rand et al. | Oct. 12, 1943 |
| 2,573,758 | Bailey | Nov. 6, 1951 |

FOREIGN PATENTS

| | | |
|---|---|---|
| 817,852 | Germany | Oct. 22, 1951 |